United States Patent
Aggarwal et al.

(10) Patent No.: US 12,202,411 B2
(45) Date of Patent: Jan. 21, 2025

(54) FRONT VEHICLE MOUNT ASSEMBLY AND SYSTEM

(71) Applicant: HEATH CONSULTANTS INCORPORATED, Houston, TX (US)

(72) Inventors: Vineet Aggarwal, Houston, TX (US); Alan Kenneth Stratton, Milford, NH (US); Christopher Gretencord, Friendswood, TX (US); Marshall Bronfin, Bedford, NH (US); Kevin Webber, Houston, TX (US); Kevin Bendele, Seabrook, TX (US)

(73) Assignee: HEATH CONSULTANTS INCORPORATED, Houston, TX (US)

( * ) Notice: Subject to any disclaimer, the term of this patent is extended or adjusted under 35 U.S.C. 154(b) by 309 days.

(21) Appl. No.: 17/879,612

(22) Filed: Aug. 2, 2022

(65) Prior Publication Data
US 2024/0042943 A1    Feb. 8, 2024

(51) Int. Cl.
*B60R 11/00*    (2006.01)
*B60R 19/52*    (2006.01)

(52) U.S. Cl.
CPC .............. *B60R 11/00* (2013.01); *B60R 19/52* (2013.01); *B60R 2011/004* (2013.01); *B60R 2011/0071* (2013.01)

(58) Field of Classification Search
CPC ... B60R 19/52; B60R 11/00; B60R 2011/004; B60R 2011/0008; B60R 13/105; F16M 11/14; F16M 11/2078; F16M 2200/08
(Continued)

(56) References Cited

U.S. PATENT DOCUMENTS

| 230,521 A | * | 7/1880 | Barker | ................... F16C 11/106 |
| | | | | 248/316.1 |
| 377,995 A | * | 2/1888 | Dougherty | ............... A47G 1/17 |
| | | | | 285/271 |

(Continued)

FOREIGN PATENT DOCUMENTS

| KR | 1020180094233 A | 8/2018 |
| WO | 2021201717 A1 | 10/2021 |

OTHER PUBLICATIONS

RAM Mounts, Agriculture ATV/UTV Mounts, 2022 National Products Inc., Seattle, Washington. https://rammount.com/pages/agriculture-atv-utv.
(Continued)

*Primary Examiner* — Christopher Garft
(74) *Attorney, Agent, or Firm* — Bracewell LLP; Douglas W. Rommelmann (57) ABSTRACT

A front vehicle mount assembly and system to mount to a vehicle grille for supporting a device. The front vehicle mount assembly including a plate having a top surface and a bottom surface and a plurality of openings extending therethrough. A cushioned pad is attached to the bottom surface of the plate. A plurality of rod-mounted claw hooks comprising a threaded fastener with a head and a hook member having a threaded bore engaging the threaded fastener extend through the plate openings. The hook members engage a back surface of the vehicle grille and the cushioned pad engages a front grille surface when the threaded fasteners are tightened. A ball mounted on a post is connected to the top surface of the plate and provides a mechanical means for mounting the device to the assembly.

19 Claims, 5 Drawing Sheets

(58) Field of Classification Search
USPC ....... 248/276.1, 663, 481–482, 181.1–181.2, 248/288.31; 411/400, 485; 52/507
See application file for complete search history.

(56) References Cited

U.S. PATENT DOCUMENTS

| | | | | |
|---|---|---|---|---|
| 425,871 | A * | 4/1890 | Fairchild | B62B 1/18 |
| | | | | 280/47.27 |
| 1,081,339 | A * | 12/1913 | Smith | B63B 29/12 |
| | | | | 248/181.2 |
| 4,121,893 | A | 10/1978 | Morissette | |
| 5,118,147 | A * | 6/1992 | Correll | E04C 2/428 |
| | | | | 403/387 |
| 5,845,885 | A * | 12/1998 | Carnevali | F16M 11/2078 |
| | | | | 248/484 |
| 5,899,167 | A * | 5/1999 | Furman | G09F 17/00 |
| | | | | 403/115 |
| 5,979,724 | A | 11/1999 | Loewenthal, Jr. et al. | |
| 6,561,476 | B2 | 5/2003 | Carnevali | |
| 7,090,181 | B2 | 8/2006 | Biba et al. | |
| 8,814,111 | B2 | 8/2014 | Hollinger | |
| 9,725,052 | B1 * | 8/2017 | Honaker | F16B 2/12 |
| 9,831,904 | B1 | 11/2017 | Carnevali | |
| 9,944,209 | B1 | 4/2018 | Carnevali | |
| 10,527,219 | B2 | 1/2020 | Carnevali | |
| 10,933,820 | B1 * | 3/2021 | Budraitis | B60R 13/105 |
| 10,982,807 | B2 | 4/2021 | Carnevali | |
| 11,287,084 | B1 | 3/2022 | Carnevali et al. | |
| 11,310,399 | B2 | 4/2022 | Phillips et al. | |
| 11,654,834 | B2 * | 5/2023 | Barvesten | B60R 11/02 |
| | | | | 224/483 |
| 2001/0019096 | A1 * | 9/2001 | Andreoli | F16M 7/00 |
| | | | | 248/677 |
| 2008/0315062 | A1 * | 12/2008 | Salman | E01F 9/635 |
| | | | | 248/519 |
| 2016/0265254 | A1 | 9/2016 | Carnevali | |
| 2018/0363842 | A1 | 12/2018 | Carnevali | |
| 2019/0241129 | A1 * | 8/2019 | Song | B60R 11/0241 |
| 2021/0347232 | A1 * | 11/2021 | Fan | B60R 11/02 |

OTHER PUBLICATIONS

RAM Mounts, RAM® Double U-Bolt Ball Base for 1.25"-1.5" Rails, 2022 National Products Inc., Seattle, Washington, https://rammount.com/products/ram-235-1u.
RAM Mounts, RAM Tough-Ball Products, B Size, 2022 National Products Inc., Seattle, Washington. https://rammount.com/collections/ram-tough-ball-b-size.
RAM Mounts, RAM Tough-Ball Products, C Size, 2022 National Products Inc., Seattle, Washington. https://rammount.com/collections/ram-tough-ball-c-size.
International Search Report and Written Opinion for PCT Application No. PCT/US2022/053237 dated Apr. 25, 2023.

* cited by examiner

FRONT VEHICLE MOUNT ASSEMBLY AND SYSTEM

CROSS-REFERENCE TO RELATED APPLICATIONS

Not applicable.

BACKGROUND OF THE INVENTION

1. Field of the Invention

The present invention relates generally to a mount assembly and system for attachment to the front of a vehicle, and more particularly to a mount assembly for attachment to a front grille of a vehicle.

2. Description of the Related Art

Oftentimes there is a need or desire to temporarily mount or attach instrumentation, equipment, lighting, signs and the like, collectively referred to as devices, to the front of a vehicle. Preferably, the mounting of the device does not cause permanent damage or affect the aesthetic appearance of the vehicle upon removal of the device and/or mount.

In certain circumstances, it may be very important that the device is mounted securely to the vehicle to minimize movement of the device relative to the front of the vehicle. For example, the device mounted to the front of the vehicle may be a laser device, atmospheric instrumentation, lighting, etc.

A common vehicle component on the front of most vehicles such as cars, trucks, SUV's, minivans, etc. is a grille. The vehicle grille is a protective metal or plastic latticework or grating located on the front of the vehicle between both headlights. Importantly, the grille covers the vehicle's front end yet allows air to get through its gaps to cool the temperature of the water in the radiator to avoid engine overheating.

Although not as important a function as the air flow capability, the most apparent function of the vehicle grille is the aesthetic benefit. Virtually all vehicle manufacturer brands treat the grille as a part of the brand's identity. Grilles are so distinctive and unique in their appearance that one can tell the brand of an approaching car by its grille. While some brands may maintain their grille design for years with minor changes, others modify their grill design more frequently. The important thing to understand is that the grilles are many and varied.

The front grille of the vehicle makes for a likely place to attach a mounting system to support a device at the front of the vehicle. However, since front vehicle grilles come in many sizes and shapes, arrangements and construction, a "universal" mount system that works on a wide variety of grille types and sizes has not been commercially available.

It is desired to have a front vehicle mount assembly that is adapted to be removably mounted to the front grille of a vehicle and which provides a system for attaching a device to the mount assembly. It is further desired that the front vehicle mount assembly be removable and not permanently alter the grille. It is also desired that the mount assembly not obstruct a significant portion of the grille air passages. It is also desired that the mount assembly not significantly affect the aesthetic appearance of the vehicle and grille.

It is also desired that the front vehicle mount assembly is versatile to mount to numerous types of vehicle grilles. It is also desired that the front vehicle mount assembly be lightweight and easy to install and remove.

Additionally, it is desirable to have a front vehicle mount assembly that allows for the attached device to be temporarily removed without removal of the entire mount assembly.

SUMMARY OF THE INVENTION

One embodiment of the present invention is a "universal" front vehicle mount assembly for attaching to the front grille of numerous types of vehicles. In the embodiment the mount assembly comprises a plate with an attached lower cushioned pad. The plate and cushioned pad have a plurality of openings therethrough, each for receiving a threaded fastener. A hook member is threadedly attached to the fastener. The plate and cushioned pad is brought into contact with the grille and the hook members are extended through grille openings. With the hook members extending partially around the back portion of grille members or bars, the fasteners are tightened and the cushioned pad deforms slightly to help maintain the position of the installed plate and protect the grille. The embodiment also includes a ball mounted on a post connected to the plate. The ball may be a solid ball that can be joined via a pair of links with another solid ball having a threaded post for attaching to a device or something else; or the ball may be a multi-piece ball connector that threads together and has a threaded post for attaching to a device or something else.

Two or more of the front vehicle mount assemblies may be used to mount a device to a vehicle grille. Additionally, two or more of the front vehicle mount assemblies may be connected to an elongate rail having a slot providing adjustability in attachment of the front vehicle mount assemblies to the vehicle grille and attaching the rail to the device.

BRIEF DESCRIPTION OF THE SEVERAL VIEWS OF THE DRAWINGS

The invention is better understood by reading the detailed description of embodiments which follows and by examining the accompanying drawings, in which.

DESCRIPTION OF THE PREFERRED EMBODIMENTS

It should be understood at the outset that although illustrative implementations of one or more embodiments are described below, the disclosed assemblies, systems and methods may be implemented using any number of techniques, whether currently known or not yet in existence. The disclosure should in no way be limited to the illustrative implementations, drawings, and techniques described below, but may be modified within the scope of the appended claims along with their full scope of equivalents.

The following brief definition of terms shall apply throughout the application:

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the field of the art;

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiment, or it may be excluded.

Embodiments of the invention will now be described with reference to the figures, in which like numerals reflect like elements throughout. The terminology used in the description presented herein is not intended to be interpreted in any restrictive or limited way, simply because it is being utilized in conjunction with the detailed description of certain specific embodiments of the invention. Furthermore, embodiments of the invention may include several novel features, no single one of which is solely responsible for its desirable attributes or which is essential to practicing the invention described herein.

Figure 1:
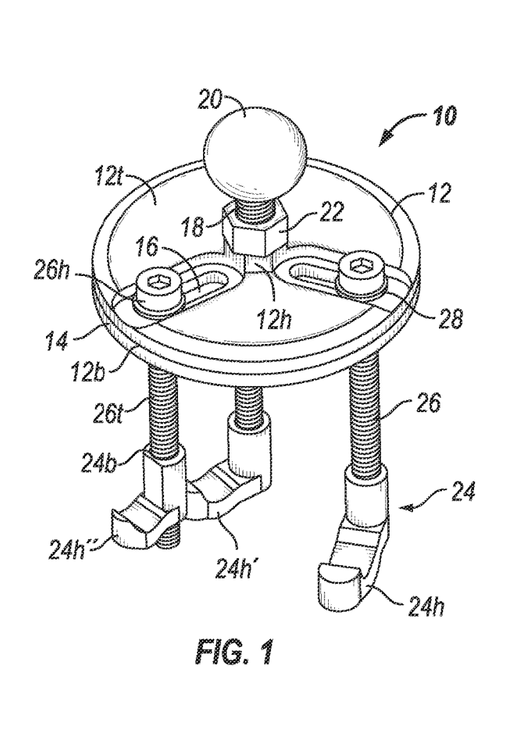
FIG. 1 is a perspective view of a preferred embodiment of the front vehicle mount assembly.

Referring to FIG. 1, a preferred embodiment of a front vehicle mount assembly 10 is shown. The mount assembly 10 includes a plate 12 having a top surface 12t and a bottom surface 12b. Preferably, the plate 12 is circular or generally circular and the top and bottom surfaces 12t, 12b are substantially planer and parallel to one another. Alternatively, the plate 12 may be of other shapes and sizes. A cushioned pad 14 is attached to the bottom surface 12b of the plate 12. A plurality of openings 16 extend through the plate 12 and attached pad 14. In the preferred embodiment at least one of the openings 16 is a slot. As shown in FIG. 1, all of the openings 16 are slots and include a counterbore around the slot opening 16. Preferably, the slots extend in a radial direction, although the slots may extend in other directions or be curved. Preferably, the plate 12 is made of a relatively stiff, durable material, as for example aluminum, stainless steel, or plastic engineering resins (PC/ABS, PC, etc.).

Preferably, the cushioned pad 14 is made of a deformable, compliant and resilient material, as for example a closed cell neoprene foam, ethylene-vinyl acetate (EVA), or thermoplastic polyurethane (TPU).

Preferably, a central portion of the top surface 12t of the plate 12 includes a hub 12h extending above the substantially planer top surface 12t. The hub 12h or the hub 12h and plate 12 have a blind threaded bore for threadedly engaging with a threaded post 18 secured to a ball 20. A nut 22 threaded on the post 18 may be used to further secure the post 18 to the plate hub 12h. The peripheral exterior surface of the hub 12h may be formed in a hexagonal shape. Securement of the post 18 to the hub 12h results in the ball 20 being in a fixed position relative to the plate 12. Alternatively, the post 18 could be molded or integral with the plate 12 and/or ball 20. The ball 20 preferably comprises a metal or plastic core with overmolded elastomeric, such as TPU.

Still referring to FIG. 1, a rod-mounted claw hook 24 includes a hook fastener 26 having a head 26h, preferably a socket head, and a threaded shank 26t and a hook member 24h having a threaded bore 24b adapted to engage the threaded shank 26t. The threaded shank 26t is sized to extend through the opening 16 and a washer 28 may be employed to fit within the counterbore and abut the hook fastener head 26h. In a preferred embodiment, the hook member 24h may be provided in a plurality of sizes to accommodate various types and sizes of grilles G. For example, the hook member 24h with a large hook, a hook member with a medium hook 24h' and a hook member with a small hook 24h".

Figure 2:
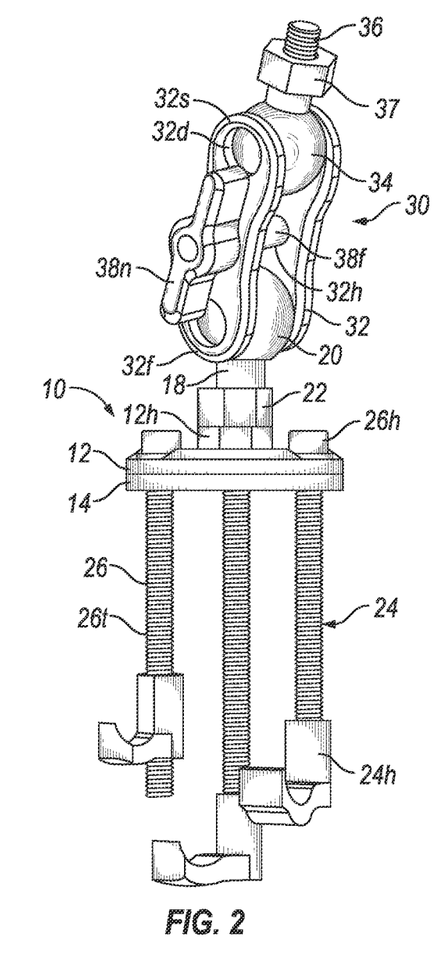
FIG. 2 is a perspective view of the front vehicle mount assembly shown in FIG. 1 having a first linkage connector attached thereto.

FIG. 2 is a perspective view of the front vehicle mount assembly shown in FIG. 1 having a linkage connector 30. The linkage connector 30 includes a pair of links 32 with each link 32 having a concave depression and/or opening 32d at first and second ends 32f and 32s respectively, of the link 32. Each link 32 has a hole 32h in a medial portion between the first and second ends 32f, 32s. The linkage connector includes a second ball 34 mounted on a post 36, preferably a threaded post. Preferably, the second ball 34 is the same size (i.e., diameter) and made of the same material as the ball 20 connected to the plate 12. Additionally, the post 36 may be the same as the post 18 connected to the ball 20. A nut 37 is threaded onto the post 36.

As shown in FIG. 2, the balls 20 and 34 are partially received in the concave depressions 32d of the pair of links 32 and a threaded fastener 38f is extended through the link holes 32h and engages a nut 38n to indirectly secure the second ball 34 and post 36 to the plate 12 in a desired orientation and location.

Figure 3:
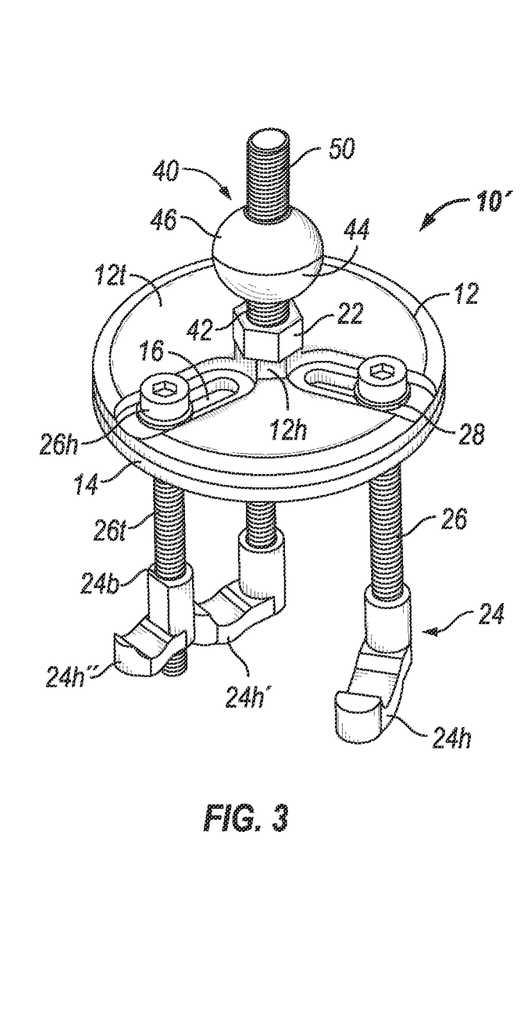
FIG. 3 is a perspective view of another preferred embodiment of the front vehicle mount assembly having a multi-piece ball connector.
Figure 3A:
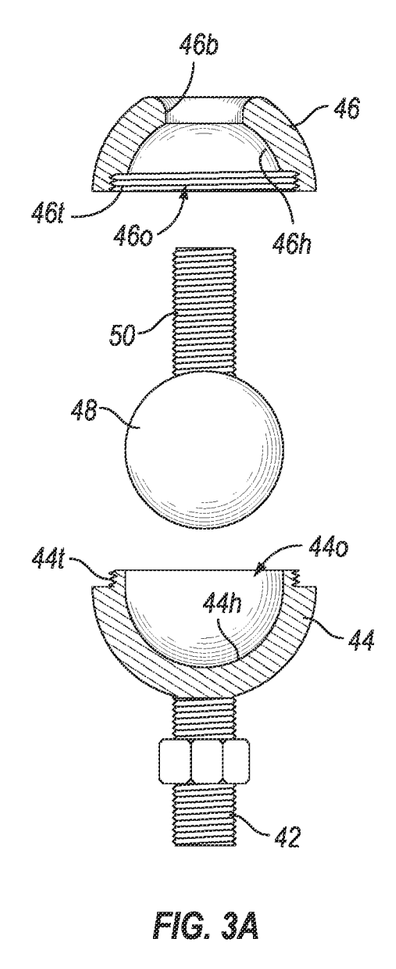
FIG. 3A is an exploded view of the multi-piece ball connector.

Referring to FIGS. 3 and 3A, another preferred embodiment of the front vehicle mount assembly, referred to as 10', is shown. Many of the features of this embodiment are the same as the prior embodiment. The same reference numbers will be used to indicate the same features. In the embodiment shown in FIGS. 3 and 3A, a multi-piece ball connector 40 replaces the ball 20, post 18 and the linkage connector 30 shown in FIG. 2.

The multi-piece ball connector 40 includes a first post 42 mounted to a first ball segment 44 at one end of the first ball segment 44. Referring to FIG. 3A, an opposite end of the first ball segment 44 has an opening 44o. The opening 44o forms part of a recessed, generally hemispherical interior surface 44h. An exterior threaded portion 44t is formed around the opening 44o.

The multi-piece ball connector 40 also includes a second ball segment 46 having an opening 46o that forms part of a recessed, generally hemispherical interior surface 46*h*. An interior threaded portion 46*t* is formed around the opening 46*o*. The interior threaded portion 46*t* is sized to threadedly engage the exterior threaded portion 44*t* of the first ball segment 44. It is to be understood that the interior threaded portion could be located on the first ball segment 44 with the exterior threaded portion located on the second ball segment. Opposite the opening 46*o* is a hole 46*b* extending through the second ball segment 46 from the generally hemispherical interior surface 46*h* to an outer surface of the second ball segment 46.

Still referring to FIG. 3A, the multi-piece ball connector 40 includes an inner ball 48 having a mounted post 50, preferably threaded post. The inner ball 48 is sized to fit, preferably snugly, in a space defined by the generally hemispherical interior surfaces 44*h* and 46*h* of the first and second ball segments 44 and 46 when they are threadedly joined with the post 50 extending through the hole 46*b*. The inner ball 48 is frictionally engaged with the generally hemispherical interior surfaces 44*h* and 46*h* of the first and second ball segments 44 and 46 upon threadedly joining the first and second ball segments 44 and 46. If the hole 46*b* is slightly larger than the diameter of the post 50, the angular direction of the post 50 will be perpendicular or substantially perpendicular to the substantially planer upper surface 12*t* of the plate 12. If the hole 46*b* is larger than the post diameter, for example by 50-100% or more, the angular direction of the post 50 relative to the plate 12 will have some limited range of adjustment from perpendicularity within the hole 46*b*. It is to be understood that the angular positioning of the post 50 in this case will be performed prior to fully threading the first and second ball segments 44 and 46 together. Once the desired angular position of the post 50 is achieved, the second ball segment 46 is tightly threaded to the first ball segment 44 and the angular position of the post 50 is fixed.

Figure 5:
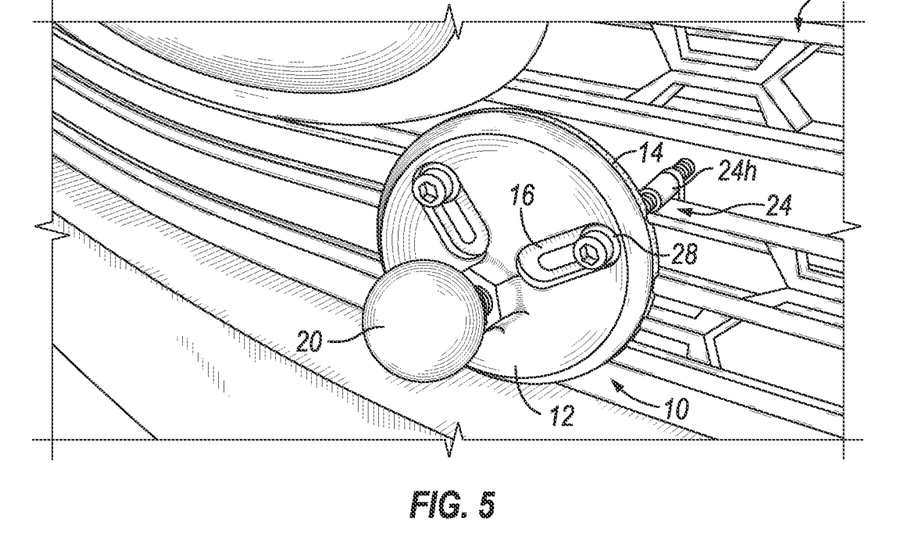
FIG. 5 is a perspective view of a front vehicle mount assembly connected to a vehicle grille.
Figure 5A:
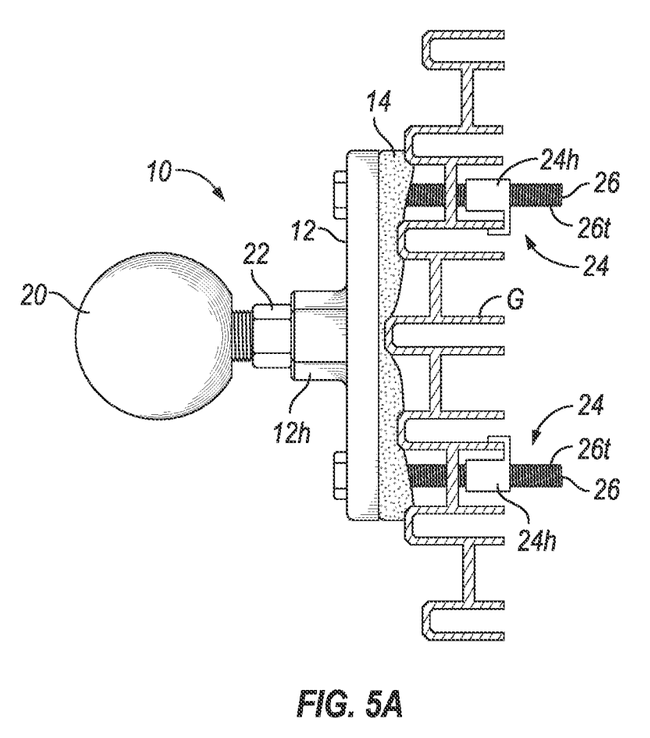
FIG. 5A is a side view of the front vehicle mount assembly connected to the vehicle grille shown in FIG. 5.

FIGS. 5 and 5A show the preferred embodiment of the front vehicle mount assembly 10 (as shown in FIG. 1) attached to a front grille G of a vehicle. The method of attaching either of the front vehicle mount assemblies 10, 10' is the same. The vehicle grille G has numerous openings to allow for the passage of air. With the rod-mounted claw hooks 24 attached to the plate 12 as shown in FIG. 1, the hook members 24*h* are extended through desired openings of the grille G to a backside location of the grille G. The hook fasteners 26 are rotated to draw the hook members 24*h* snug against the rear of a grille member and the cushioned pad 14 is brought into contact with the front of the grille G.

The slotted openings 16 allow the rod-mounted claw hooks 24 to be positioned to a desired location, preferably where the hook fastener 26 is perpendicular or substantially perpendicular to the upper planer surface 12*t* of the plate 12. The slotted openings 16 permit adjustability of the spacing of the rod-mounted claw hooks 24 and allows the front vehicle mount assembly 10, 10' to be mounted to a wide variety of grilles G and grille types.

Preferably, two or more of the rod-mounted claw hooks 24 engage the grille G to securely mount the front vehicle mount assembly 10, 10' to the grille G.

It is to be understood that the cushioned pad 14 preferably slightly deforms around the grille members as the front vehicle mount assembly 10, 10' is mounted to the grille G. This serves a couple of purposes. The deformation of the cushioned pad 14 protects the grille G from scratches and marring and also aids in fixating the positioning of the front vehicle mount assembly 10, 10' to the grille G.

Figure 6:
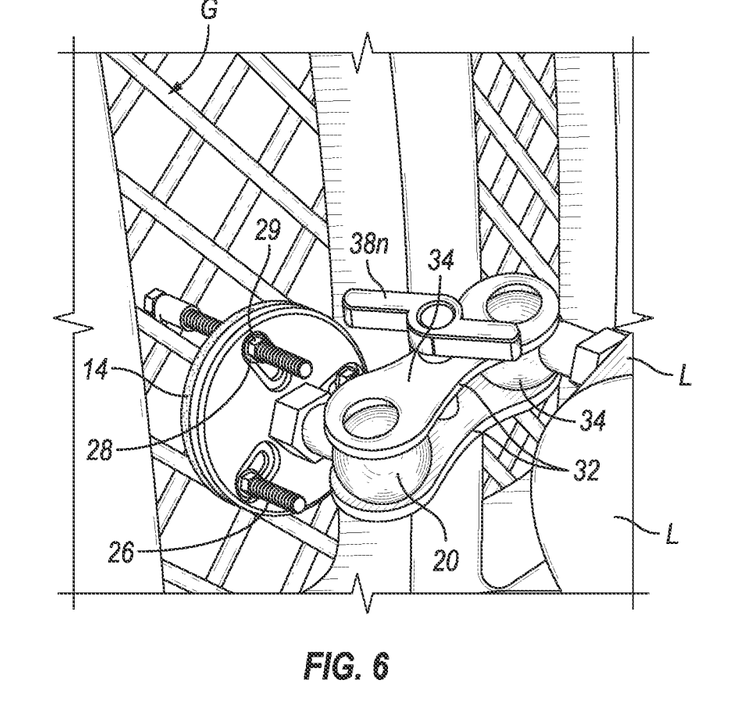
FIG. 6 is a perspective view of a front vehicle mount assembly connected in an alternative manner to another type of vehicle grille.
Figure 6A:
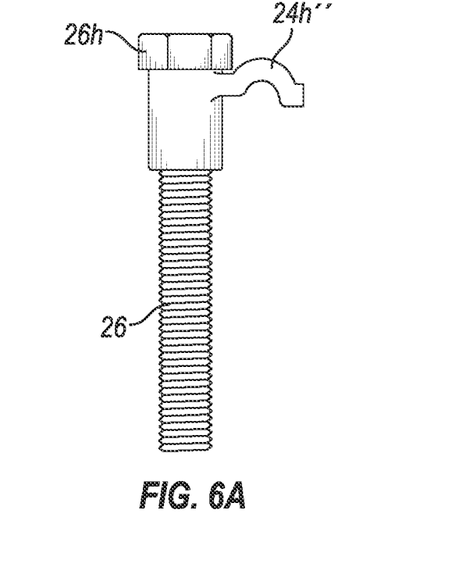
FIG. 6A is a side view of a hook member threaded onto a hook fastener.

In order to accommodate as many vehicles and grille types as possible it may be necessary in some circumstances to modify the installation of the front vehicle mount assembly 10, 10'. For example, certain vehicles may not have sufficient clearance behind the grille G for the hook fastener 26 to extend upon securing the front vehicle mount assembly 10, 10' to the grille G. In such circumstances, the hook members 24*h* may be reversed on the hook fastener 26 and threaded to the head 26*h* of the hook fastener 26 as shown in FIG. 6A. With reference to FIG. 6, the threaded shank 26*t* of the hook fastener 26 is inserted through the slotted opening 16 from the side of the cushioned pad 14 to the plate 12 and then a washer 28 and nut 29 are attached to the hook fastener 26. With the hook members 24*h* positioned behind members of the grille G, the nuts 29 are tightened to draw the hook members 24*h* snug against the rear of the grille members and the cushioned pad 14 is brought into contact with the front of the grille G.

Alternatively, a set of hook fasteners having a threaded shank with an integral hook on one end could be used.

It is to be understood that the front vehicle mount assembly 10, 10' may be used separately to mount a device to the front of the vehicle. Alternatively, two or more of either or both of the front vehicle mount assemblies 10, 10' may be used.

Figure 4:
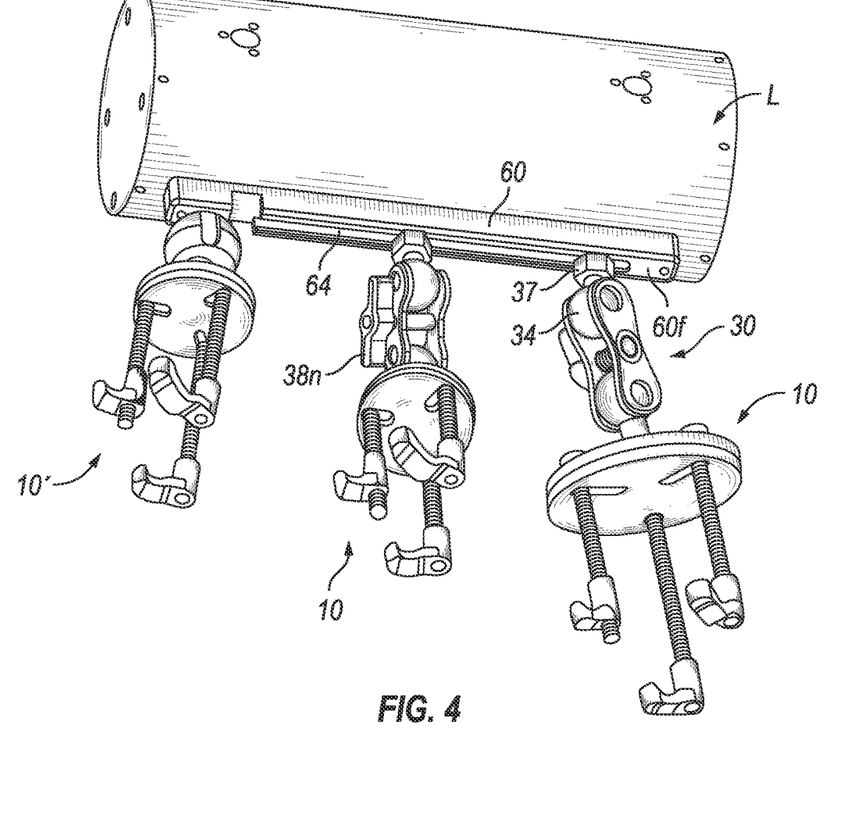
FIG. 4 is a perspective view of three front vehicle mount assemblies connected to a rail with the rail connected to a device.
Figure 4A:
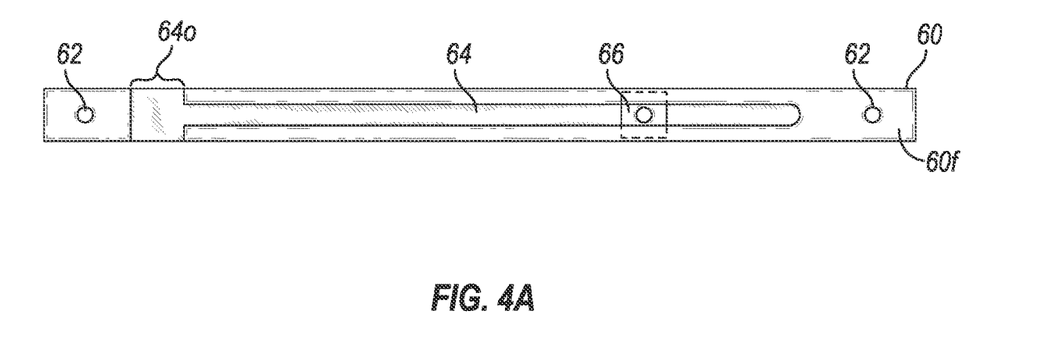
FIG. 4A is a plan view of the rail.

In certain situations, it may be desirable to mount an instrument to the front of the vehicle using a plurality of front vehicle mount assemblies 10, 10'. FIG. 4 shows an instrument L having an elongate rail 60 attached to it. The rail 60 is tubular and preferably rectangular in cross-section. Referring to FIGS. 4 and 4A, the rail 60 may include one or more holes 62, preferably threaded, in one elongate face 60*f* of the rail 60. The threaded holes 62 are sized to threadedly engage the threaded post 50 of the multi-piece ball connector 40 and/or the threaded post 36 of the linkage connector 30.

Alternatively or additionally, the rail 60 may have an elongate slot 64 with an enlarged opening 64*o* at one end. The enlarged opening 64*o* is sized to allow a nut 66, either square or hexagonal in shape, to pass through the enlarged opening 64*o* and slide within the tubular rail 60. The nut 66 is sized to thread onto the ball mounted post 36 (FIG. 2). The nut 66 and the nut 37 may be threaded on the post 36 leaving a space between the two nuts 37, 66. The nut 66 can be inserted through the enlarged opening 64*o* and then slid inside the elongate rail 60 by moving the post 36 along the elongate slot 64. At the desired location, the nut 37 may be turned such that the two nuts 37, 66 tighten against the elongate rail face 60*f* to secure the location of the ball 34.

With reference to FIG. 4, it is to be understood that the combination of the front vehicle mount assemblies 10 and 10' and the rail 60 allow for an instrument L to be mounted to a grille G on the front of a vehicle in a wide variety of positions and orientations.

It is to be understood that the preferred embodiments of the front vehicle mount assembly 10, 10' allow for an attached device to be temporarily removed without removal of the entire mount assembly. For example, it may be desirable to remove the device when the vehicle is parked or the device is not currently being used. FIG. 5 shows the front vehicle mount assembly 10 attached to the vehicle grille G. The device (not shown) may be attached to the ball-mounted post 36 of the linkage assembly 30 (FIG. 2). The linkage assembly 30 with the attached device may be connected to the ball 20 of the front vehicle mount assembly 10 by placing the balls 20 and 34 within the depressions or openings 32*d* of the pair of links 32 and tightening the nut 38n and fastener 38f Removal of the device may be accomplished by loosening the nut 38n and slipping the links 32 off the ball 20.

With reference to FIG. 2, the linkage assembly 30 allows a device attached to the post 36 to be located, oriented and positioned in numerous ways which provides great versatility.

With reference to FIGS. 3 and 3A, when the front vehicle mount assembly 10' is attached to the vehicle grille G and a device (not shown) is attached to the post 50 of the multi-piece ball connector 40, the second ball segment 46 may be unthreaded from the first ball segment 44 to remove the device along with the second ball segment, inner ball 48 and post 50 leaving the remainder attached to the grille G. The steps are reversed to re-attach the device to the vehicle grille G.

With reference to FIG. 4, the instrument L and rail 60 can be easily and quickly removed by loosening the linkage connectors 30 and unscrewing the second ball segment 46 from the first ball segment 44 and reversing the steps to re-attach the instrument L and rail 60.

Nomenclature
front grille G
instrument L
front vehicle mount assembly 10, 10'
plate 12
bottom surface 12b
hub 12h
top surface 12t
cushioned pad 14
openings 16
threaded post 18
ball 20
nut 22
rod-mounted claw hook 24
threaded bore 24b
hook member 24h, 24h', 24h"
hook fastener 26
head 26h
threaded shank 26t
washer 28
nut 29
linkage connector 30
links 32
depression 32d
first end 32f
hole 32h
second end 32s
ball 34
post 36
nut 37
fastener 38f
nut 38n
multi-piece ball connector 40
first post 42
first ball segment 44
opening 44o
generally hemispherical interior surface 44h
exterior threaded portion 44t
second ball segment 46
opening 46o
generally hemispherical interior surface 46h
interior threaded portion 46t
hole 46h
inner ball 48
post 50
elongate rail 60
elongate face 60f
hole 62
elongate slot 64
enlarged opening 64o
nut 66

While the invention has been described in detail above with reference to specific embodiments, it will be understood that modifications and alterations in the embodiments disclosed may be made by those practiced in the art without departing from the spirit and scope of the invention. All such modifications and alterations are intended to be covered. In addition, all publications cited herein are indicative of the level of skill in the art and are hereby incorporated by reference in their entirety as if each had been individually incorporated by reference and fully set forth.

What is claimed is:

1. A system for mounting an instrument to an exterior front grille of a vehicle, the exterior front grille having a plurality of grille members, each of the grille members having a front surface and a rear surface, the system comprising:
    at least two front vehicle mount assemblies, each front vehicle mount assembly comprising:
        a plate having a plurality of openings therethrough;
        a plurality of rod-mounted claw hooks; and
        a first ball mounted on a first post, and the first post connected to the plate;
    at least one of the two front vehicle mount assemblies further comprising:
        a second ball mounted on a threaded second post having first and second post nuts threaded thereon;
        a first link and a second link, each link having a first end and a second end and a concave depression or opening at each end;
        each link having a hole in a medial portion between the first and second ends; and
        a link threaded fastener and nut,
        wherein the first and second balls are partially received in the concave depressions or openings of the first and second links and the link threaded fastener is extended through the link holes and engages the nut to indirectly secure the second ball and second post to the plate in a desired orientation; and
    a tubular rail adapted to be attached to the instrument and having an elongate slot with an enlarged opening to allow the second post nut to pass through the enlarged opening,
    wherein the second ball is positioned by moving the second post along the elongate slot with the second post nut within the tubular rail and at the desired location, the first post nut is tightened against the elongate rail to secure the location of the second ball.

2. The system of claim 1, wherein at least one of the two front vehicle mount assemblies comprises:
    the first ball comprises:
        a first ball segment connected to the first post and having a generally hemispherical interior surface and a threaded portion;
        a second ball segment having a generally hemispherical interior surface, a hole and a threaded portion, the threaded portion of the second ball segment adapted to threadedly engage the threaded portion of the first ball segment; and
        an inner ball mounted on an inner ball post,
        wherein the inner ball is received within the generally hemispherical interior surfaces and the inner ball post extends through the second ball segment hole, and the first and second ball segments are threaded together to retain the inner ball within the joined first and second ball segments, and
wherein the inner ball post threadedly engages the tubular rail.

3. The system of claim 1, wherein each rod-mounted claw hook comprises a hook member capable of being oriented in a desired direction ranging from zero to 360 degrees around the threaded shank.

4. The system of claim 1, wherein each front vehicle mount assembly further comprises a cushioned pad attached to the plate, the cushioned pad adapted to abut the front surface of one or more grille members.

5. The system of claim 1, wherein one or more of the plurality of openings in the plate is a slot, the slot providing adjustability of the spacing of the rod-mounted claw hook extending through the slot relative to another rod-mounted claw hook extending through another plate opening.

6. The system of claim 1, wherein the plate is generally circular in shape.

7. The system of claim 1, wherein one or more of the plurality of openings in the plate is a radially-oriented slot.

8. The system of claim 1, wherein each of the plurality of openings in the plate includes a counterbore for receiving a fastener head of the rod-mounted claw hook.

9. The system of claim 2, wherein the second ball segment hole is larger than a diameter of the inner ball post such that the inner ball post has a range of angular positioning when the inner ball is received within the generally hemispherical interior surfaces, and the inner ball is frictionally engaged with the generally hemispherical interior surfaces of the first and second ball segments upon threadedly joining the first and second ball segments which fixes the angular position of the inner ball post.

10. A system for mounting an instrument to an exterior front grille of a vehicle, the exterior front grille having a plurality of grille members, each of the grille members having a front surface and a rear surface, the system comprising:
a tubular rail adapted to be attached to the instrument;
at least two front vehicle mount assemblies attachable to the tubular rail, each front vehicle mount assembly comprising:
a plate having a plurality of openings therethrough;
a plurality of rod-mounted claw hooks; and
a first ball mounted on a first post, and the first post connected to the plate,
at least one of the two front vehicle mount assemblies further comprising:
the first ball comprising:
a first ball segment connected to the first post and having a generally hemispherical interior surface and a threaded portion; and
a second ball segment having a generally hemispherical interior surface, a hole and a threaded portion, the threaded portion of the second ball segment adapted to threadedly engage the threaded portion of the first ball segment; and
an inner ball mounted on an inner ball post,
wherein the inner ball is received within the generally hemispherical interior surfaces and the inner ball post extends through the second ball segment hole, and the first and second ball segments are threaded together to retain the inner ball within the joined first and second ball segments, and
wherein the inner ball post is connected to the tubular rail.

11. The system of claim 10, wherein the second ball segment hole is larger than a diameter of the inner ball post such that the inner ball post has a range of angular positioning when the inner ball is received within the generally hemispherical interior surfaces, and the inner ball is frictionally engaged with the generally hemispherical interior surfaces of the first and second ball segments upon threadedly joining the first and second ball segments which fixes the angular position of the inner ball post.

12. The system of claim 10, wherein the tubular rail includes at least one hole to receive the inner ball post.

13. The system of claim 12, wherein the inner ball post threadedly engages the at least one hole of the tubular rail.

14. The system of claim 10, further comprising:
a threaded nut for threadedly engaging the inner ball post;
the tubular rail including an elongate slot adapted to receive the inner ball post,
wherein the threaded nut is received within the tubular rail and threadedly engaged to the inner ball post to secure the inner ball to the tubular rail.

15. A system for mounting an instrument to an exterior front grille of a vehicle, the exterior front grille having a plurality of grille members, each of the grille members having a front surface and a rear surface, the system comprising:
a tubular rail adapted to be attached to the instrument;
at least two front vehicle mount assemblies, each front vehicle mount assembly comprising:
a plate having at least one opening therethrough;
at least one rod-mounted claw hook; and
a first ball mounted on a first post, and the first post connected to the plate;
at least one of the two front vehicle mount assemblies further comprising:
a second ball mounted on a threaded second post;
a first link and a second link, each link having a first end and a second end and a concave depression or opening at each end;
each link having a hole in a medial portion between the first and second ends; and
a link fastener,
wherein the first and second balls are partially received in the concave depressions or openings of the first and second links and the link fastener is extended through the link holes to secure the second ball and second post to the plate in a desired orientation, and
wherein the second post is connected to the tubular rail.

16. The system of claim 15, wherein the tubular rail includes at least one hole to receive the second post.

17. The system of claim 16, wherein the second post threadedly engages the at least one hole of the tubular rail.

18. The system of claim 15, further comprising:
first and second post nuts threaded on the second post;
the tubular rail including an elongate slot adapted to receive the second post,
wherein the second post nut is received within the tubular rail and the second ball is positioned by moving the second post along the elongate slot with the second post nut within the tubular rail and at the desired location, the first post nut is tightened against the elongate rail to secure the location of the second ball.

19. The system of claim 18, wherein the elongate slot includes an enlarged opening to allow the second post nut to pass through.

* * * * *